US010044434B2

(12) United States Patent
Bourrouillou et al.

(10) Patent No.: US 10,044,434 B2
(45) Date of Patent: Aug. 7, 2018

(54) FREQUENCY CAPACITY FILL RATE ANALYZING SYSTEM AND METHOD OF AUTOMATICALLY ANALYZING THE FREQUENCY CAPACITY FILL RATE OF WIRELESS COMMUNICATION LINKS

(75) Inventors: Brice Bourrouillou, Toulouse (FR); Nathanael Chabert, Toulouse (FR); Olivier Hauw, Ste Foy d'Aigrefeuille (FR); Jean-Loup Rondeau, Colomiers (FR)

(73) Assignee: London Satellite Exchange SAS, Toulouse (FR)

( * ) Notice: Subject to any disclaimer, the term of this patent is extended or adjusted under 35 U.S.C. 154(b) by 505 days.

(21) Appl. No.: 13/607,140

(22) Filed: Sep. 7, 2012

(65) Prior Publication Data
US 2013/0065513 A1   Mar. 14, 2013

(30) Foreign Application Priority Data
Sep. 9, 2011 (EP) ..................................... 11290401

(51) Int. Cl.
*H04H 20/74* (2008.01)
*H04B 1/60* (2006.01)
(Continued)

(52) U.S. Cl.
CPC ..... *H04B 7/18519* (2013.01); *H04B 7/18513* (2013.01); *H04B 7/18563* (2013.01);
(Continued)

(58) Field of Classification Search
CPC ... H04L 1/1664; H04L 41/5038; H04L 27/00; H04L 25/03834; H04B 1/38;
(Continued)

(56) References Cited

U.S. PATENT DOCUMENTS 5,752,164 A * 5/1998 Jones .......................... 455/454
6,272,325 B1 * 8/2001 Wiedeman ......... H04B 7/18543
340/600
(Continued)

FOREIGN PATENT DOCUMENTS

DE        100 22 659 A1    10/2001

OTHER PUBLICATIONS

European Search Report dated Mar. 26, 2012, (nine (9) pages), XP55019130.
(Continued)

*Primary Examiner* — Yuwen Pan
*Assistant Examiner* — Paul P Tran
(74) *Attorney, Agent, or Firm* — Crowell & Moring LLP

(57) ABSTRACT

A frequency capacity fill rate analyzing system for analyzing the frequency capacity fill rate of wireless communication links, in particular satellite communication links, includes at least one transmitter and at least one receiver between which the communication link is established, and a spectrum analyzer associated to the at least one receiver. The spectrum analyzer is connected to a central controlling device that is provided with a data processing unit on which an analysis task management software is running, and which is connected to a database in which technical parameters of the communication link are stored. The data processing unit is configured such that the spectrum analyzer automatically analyzes the frequency capacity fill rate of radio frequency signals transmitted via the communication link on the basis of an analysis task obtained from the central controlling device.

15 Claims, 2 Drawing Sheets

Figure 1:
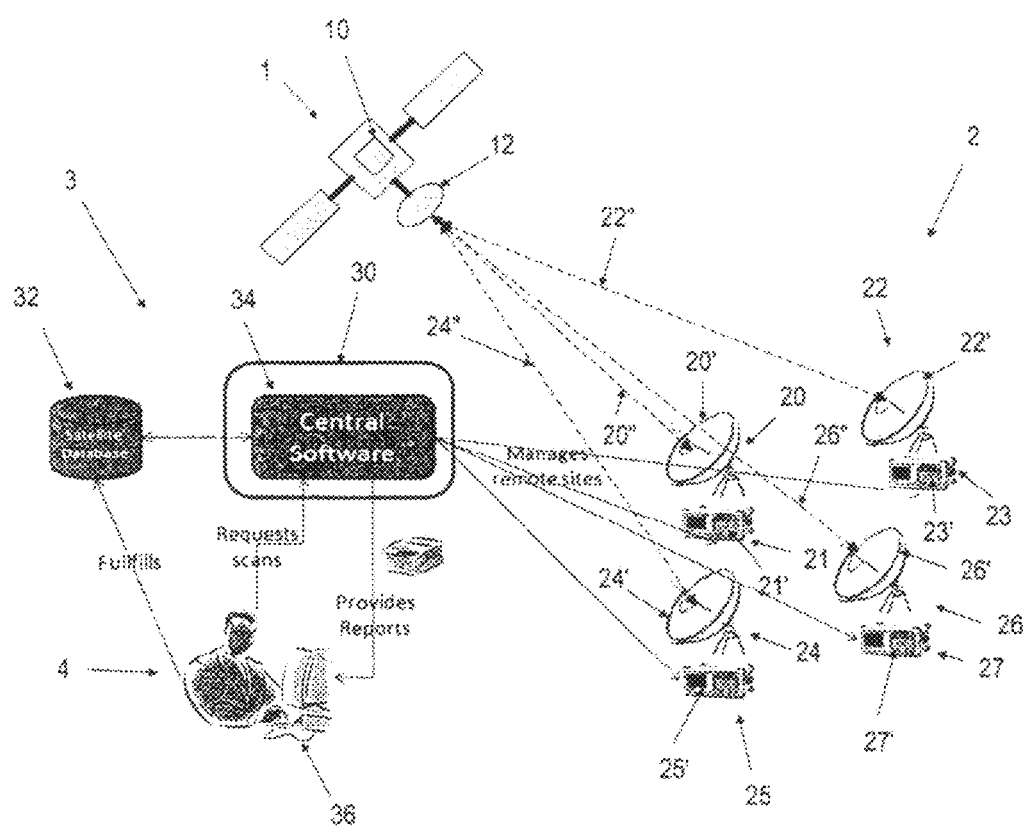

(51) Int. Cl.
| | |
|---|---|
| H04M 1/00 | (2006.01) |
| H01Q 21/06 | (2006.01) |
| H01Q 21/24 | (2006.01) |
| H04B 7/10 | (2017.01) |
| H01Q 3/00 | (2006.01) |
| H01Q 3/02 | (2006.01) |
| H01Q 3/12 | (2006.01) |
| H01Q 13/00 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04W 4/00 | (2018.01) |
| H04K 1/10 | (2006.01) |
| H04L 27/28 | (2006.01) |
| H04L 1/02 | (2006.01) |
| H04B 7/185 | (2006.01) |
| H04B 17/20 | (2015.01) |
| H04B 17/373 | (2015.01) |
| H04W 16/14 | (2009.01) |
| H04W 24/08 | (2009.01) |

(52) U.S. Cl.
CPC ........... *H04B 17/20* (2015.01); *H04B 17/373* (2015.01); *H04W 16/14* (2013.01); *H04W 24/08* (2013.01)

(58) Field of Classification Search
CPC ........... H04B 7/18519; H04B 7/18552; H04B 7/1855; H04B 7/185; H04B 7/18597; H04B 17/004; H04B 17/0045; H04B 17/0057; H04B 17/0067; H04B 17/007; H04B 17/0075; H04B 7/155; H04B 7/181513; H04B 7/2606; H04B 17/20; H04B 7/1815; H04B 7/18515; H04B 7/18563; H04B 1/71632; H04B 7/18512; H04B 7/18547; H04B 17/318; H04B 17/373; H04H 40/90; H04H 60/41; H04W 16/12; H04W 16/14; H04W 16/24; H04W 24/00; H04W 24/02; H04W 24/08; H04W 24/10; H04W 84/06; H04W 88/14; H04W 84/047; H04W 84/08; H04W 88/04; H04W 72/02; G01H 3/08; G01R 23/165; G01S 19/28

USPC ............ 455/3.02, 9, 428, 454, 456.1, 509; 342/357.67, 367, 42, 442; 370/252, 338; 375/224, 340; 702/95, 188
See application file for complete search history.

(56) References Cited

U.S. PATENT DOCUMENTS

| | | | | |
|---|---|---|---|---|
| 6,362,772 | B1* | 3/2002 | Skotch et al. | 342/42 |
| 7,224,752 | B2* | 5/2007 | Sugar | H04W 16/14 375/224 |
| 7,254,191 | B2* | 8/2007 | Sugar et al. | 375/340 |
| 2006/0276143 | A1* | 12/2006 | Anglin, Jr. | H04B 1/71632 455/81 |
| 2007/0248061 | A1* | 10/2007 | Poston | H04W 72/02 370/338 |
| 2007/0281609 | A1* | 12/2007 | Monte et al. | 455/12.1 |
| 2009/0066850 | A1* | 3/2009 | Wu | H04N 5/50 348/731 |
| 2010/0199350 | A1* | 8/2010 | Lilibridge | G06F 9/4843 726/24 |
| 2012/0052811 | A1* | 3/2012 | Watson | H04B 17/00 455/62 |

OTHER PUBLICATIONS

"SigMon 1000 Series—Simplified and Improved Automatic RF Monitoring Tool", http://www.sat.com/products/literature/sigmonBasic.pdf, Jan. 1, 2005, (two (2) pages), XP55019130.

"Monics Satellite Carrier Monitoring System", http://www.sat.com/products/literature/monicsbrochure.pdf, Jan. 28, 2012, (four (4) pagesa), XP55019236.

"QMS200 Quality Monitoring System", http://www.gcs-salzburg.at/pbriefs/pb_qms.pdf, Sep. 20, 2011, (two (2) pages), XP002669363.

"Newsletter Archive", http://gcs-salzburg.at/newsletter.html, Feb. 13, 2012, (four (4) pages), XP002669364.

"Sigmon, Detect, Analyze and Geo-locate RFI, Land Sea, Air and Space", http://www.sat.com/products/literature/sigmonAnalyzeRFI.pdf, Dec. 31, 2007, (four (4) pages), XP55019137.

"Report ITU-R SM.2182, Measurement Facilities Available for the Measurement of Emissions from both GSO and non-GSO Space Stations", http://www.itu.int/dms_pub/itu-r/opb/rep/R-REP-SM.2182-2010-PDF-E.pdf, Sep. 30, 2010, (forty-five (45) pages), XP55019129.

Richard Irwin, "Monitoring Satellite Channel Performance—An Automatic System Based on the HP 8568A Spectrum Analyzer", ARFTG Conference Digest—Spring, Nov. 1, 1983, pp. 79-80, XP031055269.

European Office Action issued in European counterpart application No. 11 290 401.6-1874 dated Dec. 6, 2017 (Five (5) pages).

* cited by examiner

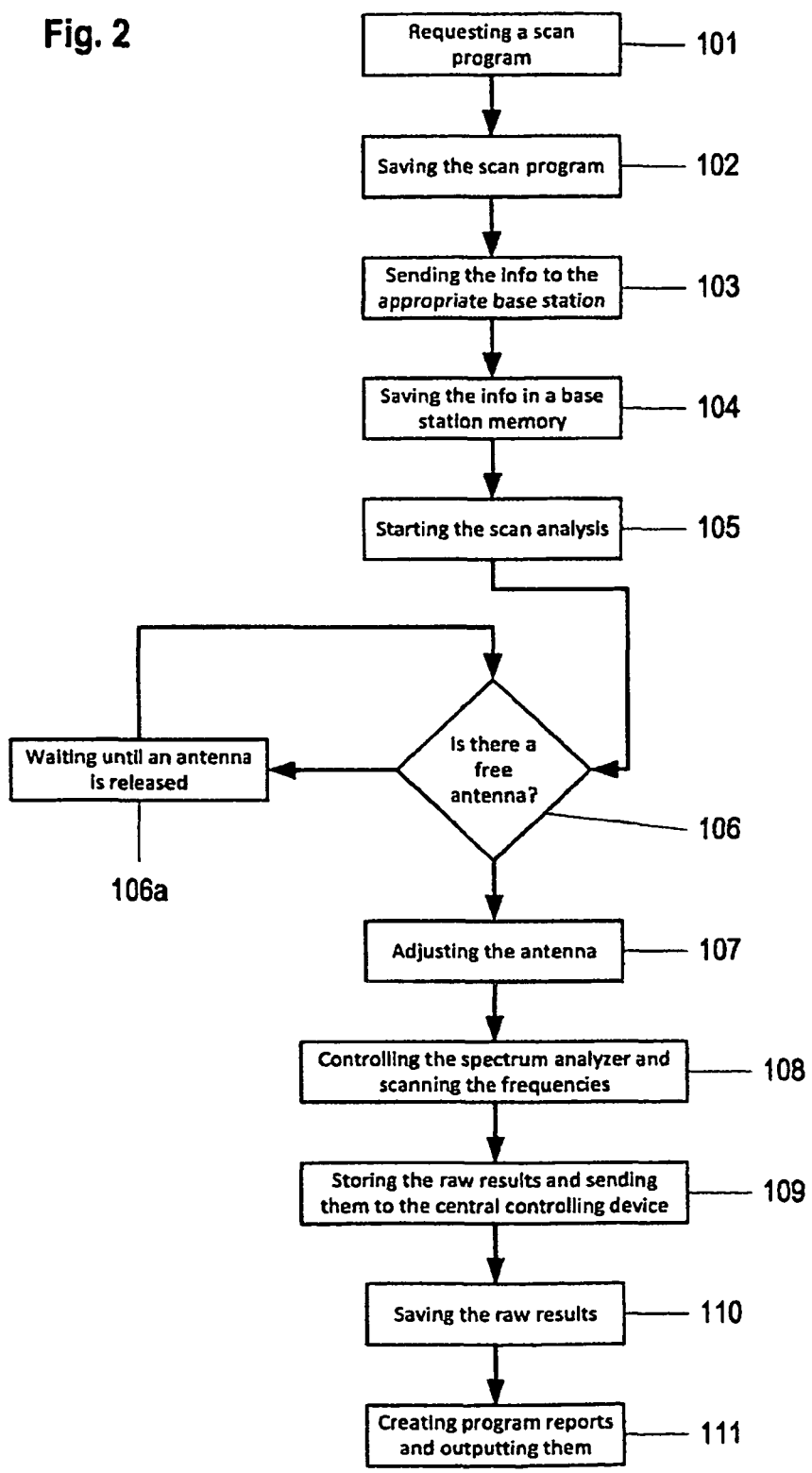

FREQUENCY CAPACITY FILL RATE ANALYZING SYSTEM AND METHOD OF AUTOMATICALLY ANALYZING THE FREQUENCY CAPACITY FILL RATE OF WIRELESS COMMUNICATION LINKS

FIELD OF THE INVENTION

The present application claims priority under 35 U.S.C. § 119 to European Patent Application No. 11 290 401.6-2411, filed Sep. 9, 2011, the entire disclosure of which is herein expressly incorporated by reference.

FIELD OF THE INVENTION

The present invention is directed to a frequency capacity fill rate analyzing system for analyzing the frequency capacity fill rate of wireless communication links. The invention is further directed to a method of automatically analyzing the frequency capacity fill rate of a predefined communication link between a transmitter and a receiver. The invention is also directed to computer software designed to carry out such a method.

A frequency capacity fill rate analysis is carried out in particular for satellite communication links; however, it can also be carried out with every other radio frequency communication link.

BACKGROUND OF THE INVENTION

The knowledge of the degree of capacity utilization is important for the efficiency of communication links, in particular, in the case of satellite communication links. Presently, geostationary satellites frequency capacity fill rate analyses are carried out manually. These manual analyses are carried out from a base station where the antennas are moved manually and the digital spectrum analyzer is managed by a person controlling the analysis with a computer. This manual solution is time consuming and in the case of Ku-band visible geostationary orbit arc from a station, e.g. from a station situated in Toulouse, France, the analysis is performed in a 4.5 months time frame with one antenna and one full-time operator.

The main drawback of this manual analysis is that in the case of a study covering analyses of communication links from several satellites, at the end of the whole study, the analysis of the first satellite pointed was probably not accurate anymore. Due to this time-consuming process the analyses could not be performed on a regular basis, giving the results a lower level of interest and less value.

It is thus an object of the present invention to provide a frequency capacity fill rate analyzing system that allows analyzing the frequency capacity fill rate of wireless communication links faster in order to obtain a more real time information that can be trusted more and that more accurately characterizes the actual conditions than the results obtained with the prior art manual process. It is a further object of the invention to provide a method of automatically analyzing the frequency capacity fill rate of a predefined communication link that allows such more real time information.

SUMMARY OF THE INVENTION

The provision of the data processing unit that is configured such that the spectrum analyzer automatically analyses the frequency capacity fill rate of radio frequency signals transmitted via the communication link allows automated analyses so that there is no need for human intervention, which results in a large gain of time. The obtained information is thus more up-to-date and can be trusted more.

Preferably the transmitter is located onboard of a satellite and a plurality of receivers are provided in base stations located at different places of the world. Transmitter and receivers constitute a plurality of communication links from said satellite based transmitter to the receivers. This system allows very effective analyses of satellite communication links. Having more than one base station available through which communication links from a non-geostationary satellite exist allows the analysis to be performed without interruption even if the satellite leaves the visible horizon of one of the base stations. The analysis can thus be carried out continuously over the satellite orbit.

Further preferably, a plurality of transmitters are located, each onboard of one of a plurality of satellites and wherein a plurality of communication links is established between said transmitters provided onboard of said satellites and said receivers provided in said base stations. This embodiment is advantageous if an analysis of communication links from or via a plurality of satellites is to be carried out.

The technical parameters stored in the data base can preferably comprise communication link frequencies, coverage of the satellite(s), orbital position of the satellite(s) and/or polarization of the communication link(s).

An exemplary method comprises the steps of a) procuring characteristic technical parameter data of said communication link and/or of at least one of said transmitters from a database in which these data are stored and defining a scanning program;

b) carrying out the frequency capacity fill rate analysis by scanning the available frequencies on said communication link according to a scan algorithm;

c) storing the results of the scans in a result database and provide the associated report.

The scanning program is preferably defined and automatically generated in a central controlling device and is transferred to the appropriate remote site where the frequency capacity fill rate analysis is carried out.

Preferably, the definition of a scanning program comprises the definition of the frequency bands to be scanned and/or the start date, the end date and the periodicity of the scans.

In a preferred further development of the inventive method said transmitter is located onboard of a satellite and the step of carrying out the frequency capacity fill rate analysis is characterised by the sub steps b1) splitting the running program into unit scan program steps;

b2) sending the data of the unit scan program steps to a base station which has visible contact to said satellite;

b3) selecting of a compatible and free antenna of said base station;

b4) executing the unit scan program step(s) by carrying out the scan algorithm and storing the retrieved characteristic of all carrier frequencies found with the parameters of the executed unit scan program step(s).

In case the selected antenna associated with the receiver is a moveable antenna, it is advantageous if the definition of a scanning program also comprises the position to which the antenna is to be pointed and when a pointing operation of the selected antenna is carried out before the unit scan program step is executed.

The invention is further directed to a computer program product configured to be loaded directly into a non-transitory user memory of a data processing unit and including software code sections configured to execute the steps according to anyone of the methods of the present invention.

BRIEF DESCRIPTION OF THE DRAWING FIGURES

The invention is hereinafter described by example with reference to the drawings. In these drawings FIG. 1 shows a schematic architecture of a frequency capacity fill rate analyzing system according to the invention; and FIG. 2 shows an example of a process carried out according to a method according to the present invention.

DETAILED DESCRIPTION OF THE INVENTION

FIG. 1 shows a schematic/exemplary architecture of a frequency capacity fill rate analyzing system according to the present invention. A satellite 1 is positioned at a geostationary orbit. Four remote base stations 20, 22, 24, 26 of a ground-based communication network 2 are placed at different locations on earth. Each one of the base stations 20, 22, 24, 26 is provided with a receiver 21, 23, 25, 27 and an antenna 20', 22', 24', 26'.

A transmitter 10 is located onboard of the satellite 1 that has an antenna 12 connected to said transmitter 10.

Communication links 20", 22", 24", 26" between satellite 1 and each of the base stations 20, 22, 24, 26 are shown in FIG. 1 schematically as dashed lines.

Every receiver 21, 23, 25, 27 is provided with a spectrum analyzer 21', 23', 25', 27'. Every spectrum analyzer associated with dedicated software developed within the invention is able to analyze the radio frequency spectrum of the associated communication link.

A central controlling device 30 is provided in a central controlling facility 3 that is located remote from said base stations. The central controlling device 30 is connected to the spectrum analyzers in every base station 20, 22, 24, 26 in order to allow data exchange between each base station's analyzer and the controlling device. The data transfer can also be carried out manually in case there is no direct connection between the central controlling device 30 and a base station.

The controlling device 30 is further connected to a satellite database 32 in order to exchange data between the database 32 and the controlling device 30. Furthermore, the controlling device 30 is provided with a data processing unit 34 on which a dedicated analysis task management software is running. A human-machine interface 36 is also connected to the central controlling device 30 so that a user 4 can enter scan requests for scanning and then analyzing the communication link into the central controlling device 30 or can obtain analysis reports from the central controlling device 30. The human-machine interface 36 can also be used to enter data into the database 32

The database 32 contains all necessary satellite information (frequencies, coverage, orbital position, polarization). The dedicated analysis task management software is running on the data processing unit 34 and manages the scan requests obtained from the user 4 through the human-machine interface 36 and automatically interacts with the equipments of the remote base stations, in particular the spectrum analyzers, and finally delivers the analysis report to e.g. a printer or a monitor of the human-machine interface 36.

FIG. 2 shows the flow-chart of an exemplary method according to the invention.

In step 101 a user 4 enters a scan program request at the human-machine interface 36. This request defines the base station, the frequency bands, the start date, the end date and the periodicity of the scan request. In case the antenna or the antennas of the base station is/are directional antenna(s), the position to position the antenna(s) is also defined in the scan program request.

This request is stored in step 102 in a memory of the central controlling device 30 and the program for carrying out the capacity fill rate analysis is automatically planned by the data processing unit 34 using the satellite data stored in database 32. The central controlling device 30 receives the user selected data, controls its validity and runs a check on the technical feasibility and redundancy between programs. The program for carrying out the capacity fill rate analysis is split into a list of unit scan program steps.

In the next step 103 the analysis program, which is split into unit scan program steps, sends respective unit scan program steps to the appropriate base station that has a communication link to the satellite 1. The unit scan program data are sent as an XML file to the selected base station. The communication between the central controlling device and the respective base station uses checksums, acknowledgments and timeouts to ensure correct data transmission. The transmission of these data can be carried out automatically or manually.

The information about the unit scan program steps to be carried out by the base station is then saved in step 104 in a memory of the concerned base station computer. The base station receives the unit scan program data, saves these data in a database in the memory, and checks in the database whether there are any further scans to be done. If there are other scans waiting the new scan is added into a queue.

In the following step 105 the spectrum analyzer of the respective base station starts the scan analysis by first checking whether a compatible and free antenna is available.

If a free antenna is identified in step 106 the antenna is adjusted (step 107) to the satellite in order to optimize the communication link in case the antenna is a moveable antenna. If there is no free antenna identified in step 106 the spectrum analyzer waits until an antenna is released (step 106A).

In step 108 the spectrum analyzer is then controlled by the associated invention software and the unit scan program and scans the frequencies of the communication link by executing the scanning algorithm and retrieving the characteristics of all the carriers found with the parameters of the unit scan.

The results obtained in these unit scans are stored in following step 109 in a memory and are then sent to the central controlling device 30. The central controlling device 30 saves these obtained raw results in step 110 in a database 32 and in step 111 creates analyzing program reports which are handed over to the human-machine interface 36. The creation of the program reports can be an asynchronous or synchronous process, i.e., reports are either created or updated when new data are received from the base station or reports are created or updated on demand.

The core of the preferred example of the present invention is to automatically analyze the frequency capacity fill rate of received radio frequency signals, using many antennas (motorized or fixed) located in various places all around the world. Those analyses being synchronized and managed from one main location (the central controlling facility 3) by a dedicated computer software. The whole analyzing process according to a method of the present invention can work in the background with non-dedicated antennas, when these antennas are not used for their primary task or it can work in foreground with a dedicated infrastructure.

The input for the process according to the method of the invention comes from database 32 describing (among other features) the frequency channels that are allowed by regulators for being used in this communication link. The method according of the invention automatically configures (upon request or with a specific planning) the needed antenna(s) and the associated digital spectrum analyzer in order to provide the radio frequency results of the frequency capacity fill rate.

The invention can be used for a multi-global coverage analysis. No human operator is needed between the initial request and the report layout due to the automated process that is quick and timesaving and can be carried out for 24 hours seven days a week. The frequency scans and the analysis can be carried out in background behind the primary use of the communication infrastructure. The process according to the invention does not perform only one single scan, it checks at different times the "holes" detected to confirm that a space of capacity is not used irregularly. Moreover, the information provided is trustable timely speaking, which means that the obtained data are "fresh" up-to-date data.

The results can be presented in various forms for different types of request:
- satellite fill rate report for one single operator in order to link contracts with real usage;
- regional report for evolution of capacity usage in order to benchmark satellite operators;
- on demand transponder or lease analysis usage in order to analyze the use over a short period of time and possibly identify synergies between customers;
- available capacity search in order to find potential unused capacity on specific satellites.

The invention can be used in order to find available (and presently not used) capacity; to buy the capacity at a good price or to be able to forecast the trend on specific markets of interest such as C-band over Africa or Ku-band over Europe.

The invention is not restricted to the above-described exemplary embodiment, which only serves for a general explanation of the core concept of the invention. Rather, it is within the scope of protection that the frequency capacity fill rate analyzing system in accordance with the invention could also adopt different forms than those of the embodiments described above. In particular thereby, the device may comprise features which represent a combination of the respective individual features of the claims.

The reference symbols in the claims, the description and the drawings serve only to provide a better understanding of the invention and are not intended to limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 satellite
3 the central controlling facility
4 user
10 transmitter
12 antenna
20 a ground-based communication network
20" communication links
21 receiver
21' a spectrum analyzer
22 a ground-based communication network
22" communication links
23 receiver
23' a spectrum analyzer
24 a ground-based communication network
24" communication links
25 receiver
25' a spectrum analyzer
26 a ground-based communication network
26" communication links
27 receiver
27' a spectrum analyzer
30 a central controlling device
32 database
34 a data processing unit
36 a human-machine interface

What is claimed is:

1. A frequency capacity fill rate analyzing system for analyzing the frequency capacity fill rate of satellite communication links, the system comprising:
    at least one transmitter located onboard of a satellite;
    a plurality of base stations, wherein each base station includes a receiver and a spectrum analyzer, wherein each base station is located at a different place of the world, and wherein each base station has an established communication link with the transmitter, and
    a central controlling device connected to the spectrum analyzers of each of the plurality of base stations, wherein the central controlling device includes a data processing unit on which an analysis task management software is running, and is connected to a database in which technical parameters of the communication links are stored, and
    wherein the data processing unit is configured to:
        synchronize and manage each of the spectrum analyzers such that the spectrum analyzers automatically analyze the frequency capacity fill rate of radio frequency signals transmitted via said communication links on the basis of an analysis task obtained from said central controlling device, wherein the analysis task splits the frequency capacity fill rate analysis among the spectrum analyzers according to the technical parameters of each of the communication links established between the transmitter and each corresponding, respective one of the base stations, wherein the frequency capacity fill rate analysis is split among the spectrum analyzers based on a pointing position of each of a plurality of antennas associated with the receiver of a corresponding, respective one of the plurality of base stations, and
        identify available capacity of the satellite based on said analysis of the frequency capacity fill rate.

2. The frequency capacity fill rate analyzing system according to claim 1, wherein a plurality of transmitters are provided, each onboard of one of a plurality of satellites and wherein a plurality of communication links is established between said transmitters provided onboard of said satellites and said receivers provided in said base stations.

3. The frequency capacity fill rate analyzing system according to claim 1, wherein the technical parameters stored in the database comprise communication link frequencies, coverage of the satellite(s), orbital position of the satellite(s), polarization of the communication link(s).

4. A method of automatically analyzing the frequency capacity fill rate of predefined communication links between a transmitter located onboard a satellite and a plurality of receivers comprising the steps of:
(a) procuring characteristic technical parameter data of said communication links or of said transmitter from a database in which the characteristic parameter data are stored and defining a scanning program, wherein each of the plurality of receivers are part of a corresponding base station that includes a spectrum analyzer, and wherein the plurality of base stations are located at different places of the world;
(b) carrying out the frequency capacity fill rate analysis by each of the spectrum analyzers scanning the available frequencies on said respective communication link according to a scan algorithm, wherein the scan algorithm splits the frequency capacity fill rate analysis among the spectrum analyzers according to the technical parameters of each one of the communication links established between the transmitter and each corresponding, respective one of the base stations, wherein the frequency capacity fill rate analysis is split among the spectrum analyzers based on a pointing position of each of a plurality of antennas associated with the receiver of a corresponding, respective one of the plurality of base stations;
(c) storing the results of the scans in a result database;
(d) synchronizing and managing, by a data processing unit of a central controlling device, the frequency capacity fill rate analysis by each of the spectrum analyzers; and
(e) identifying, by the data processing unit, available capacity of the satellite based on said frequency capacity fill rate analysis.

5. The method according to claim 4, wherein a definition of a scanning program comprises a definition of the frequency bands to be scanned or the start date, the end date and the periodicity of the scans.

6. The method according to claim 4, wherein the step of carrying out the frequency capacity fill rate analysis comprises the steps of:
b1) splitting the scanning program into unit scan program steps;
b2) transferring data of the unit scan program steps to each of the plurality of base stations having visible contact to said satellite;
b3) selecting a compatible and free antenna of each of said base stations;
b4) executing the unit scan program step(s) by carrying out the scan algorithm and storing the retrieved characteristic of all carrier frequencies found with the parameters of the executed unit scan program step(s).

7. The method according to claim 6, wherein in case the selected antenna is a moveable antenna, a definition of a scanning program also comprises a position to which the antenna is to be pointed and wherein a pointing operation of the selected antenna is carried out before the unit scan program step is executed.

8. A computer program product comprising computer-readable code that is stored in a non-transitory computer readable medium, wherein the computer program product automatically analyzes the frequency capacity fill rate of predefined communication links between a transmitter located onboard a satellite and a plurality of receivers, wherein execution of the computer-readable code comprises:
a) procuring characteristic technical parameter data of said communication links or of said transmitter from a database in which the characteristic parameter data are stored and defining a scanning program, wherein each of the plurality of receivers are part of a corresponding base station that includes a spectrum analyzer, and wherein the plurality of base stations are located at different places of the world;
b) carrying out the frequency capacity fill rate analysis by each of the spectrum analyzers scanning the available frequencies on said respective communication link according to a scan algorithm, wherein the scan algorithm splits the frequency capacity fill rate analysis among the spectrum analyzers according to the technical parameters of each one of the communication links established between the transmitter and each corresponding, respective one of the base stations, wherein the frequency capacity fill rate analysis is split among the spectrum analyzers based on a pointing position of each of a plurality of antennas associated with the receiver of a corresponding, respective one of the plurality of base stations;
c) storing the results of the scans in a result database;
(d) synchronizing and managing, by a data processing unit of a central controlling device, the frequency capacity fill rate analysis by each of the spectrum analyzers; and
(e) identifying, by the data processing unit, available capacity of the satellite based on said frequency capacity fill rate analysis.

9. The computer program product according to claim 8, wherein a definition of a scanning program comprises a definition of the frequency bands to be scanned or the start date, the end date and the periodicity of the scans.

10. The computer program product according to claim 8, wherein the step of carrying out the frequency capacity fill rate analysis comprises the steps of:
b1) splitting the scanning program into unit scan program steps;
b2) transferring data of the unit scan program steps to each of the plurality of base stations having visible contact to said satellite;
b3) selecting a compatible and free antenna of said base station;
b4) executing the unit scan program step(s) by carrying out the scan algorithm and storing the retrieved characteristic of all carrier frequencies found with the parameters of the executed unit scan program step(s).

11. The computer program product according to claim 10, wherein in case the selected antenna is a moveable antenna, a definition of a scanning program also comprises a position to which the antenna is to be pointed and wherein a pointing operation of the selected antenna is carried out before the unit scan program step is executed.

12. The frequency capacity fill rate analyzing system according to claim 1, wherein the central controlling device is configured to:
store, in a memory of the central controlling device, a plurality of scanning programs based on which the analysis task is performed, and
determine a redundancy between the scanning programs stored in the memory of the central controlling device.

13. The frequency capacity fill rate analyzing system according to claim 12, wherein the central controlling device is configured to determine a technical feasibility of the scanning programs.

14. The method according to claim 4, further comprising:
- storing, in a memory of the central controlling device, a plurality of scanning programs based on which the scan algorithm is carried out; and
- determining a redundancy between said scanning programs stored in the memory of the central controlling device.

15. The computer program product according to claim 8, wherein the execution of the computer-readable code further comprises:
- storing, in a memory of the central controlling device, a plurality of scanning programs based on which the scan algorithm is carried out; and
- determining a redundancy between said scanning programs stored in the memory of the central controlling device.

\* \* \* \* \*